United States Patent
Foster et al.

(10) Patent No.: US 7,021,519 B2
(45) Date of Patent: Apr. 4, 2006

(54) FRICTION WELDING

(75) Inventors: Derek John Foster, Bristol (GB); Timothy Peter Roberts, North Somerset (GB)

(73) Assignee: Rolls-Royce PLC, London (GB)

( * ) Notice: Subject to any disclaimer, the term of this patent is extended or adjusted under 35 U.S.C. 154(b) by 58 days.

(21) Appl. No.: 10/308,146

(22) Filed: Dec. 3, 2002

(65) Prior Publication Data

US 2003/0141344 A1     Jul. 31, 2003

(30) Foreign Application Priority Data

Jan. 15, 2002     (GB) .................................. 0200813

(51) Int. Cl.
*B23K 20/12*     (2006.01)
*B23K 31/02*     (2006.01)

(52) U.S. Cl. .................. 228/112.1; 228/113; 228/114.5

(58) Field of Classification Search ............. 228/112.1, 228/113, 114.5
See application file for complete search history.

(56) References Cited

U.S. PATENT DOCUMENTS

| | | | | |
|---|---|---|---|---|
| 3,777,360 A | * | 12/1973 | Welch | 228/114.5 |
| 3,798,011 A | * | 3/1974 | Sharp, Jr. | 138/143 |
| 4,407,533 A | * | 10/1983 | Giebeler | 285/281 |
| 5,428,198 A | * | 6/1995 | Peigney et al. | 219/61 |
| 5,828,032 A | * | 10/1998 | Krzys et al. | 219/121.64 |
| 5,876,183 A | * | 3/1999 | Furlan et al. | 416/213 R |
| 5,897,964 A | | 4/1999 | White et al. | |
| 6,019,272 A | | 2/2000 | Badgley et al. | |
| 6,273,474 B1 | * | 8/2001 | DeLange et al. | 285/55 |
| 6,530,624 B1 | * | 3/2003 | Stach | 301/65 |
| 6,703,093 B1 | * | 3/2004 | Foster | 428/36.9 |
| 6,766,939 B1 | * | 7/2004 | Shepherd | 228/112.1 |
| 2001/0009107 A1 | * | 7/2001 | Cheng et al. | 72/348 |
| 2003/0061698 A1 | * | 4/2003 | Daehn | 29/505 |
| 2004/0099493 A1 | * | 5/2004 | Himmelsbach et al. | 188/250 B |

FOREIGN PATENT DOCUMENTS

| | | |
|---|---|---|
| DE | 24 06 828 A | 8/1975 |
| EP | 0 368 642 A2 | 5/1990 |
| EP | 1 206 996 A2 | 5/2002 |

(Continued)

OTHER PUBLICATIONS

The American Heritage Dictionary, 2$^{nd}$ edition, pp. 949 and 1128.*

(Continued)

*Primary Examiner*—Lynne R. Edmondson
(74) *Attorney, Agent, or Firm*—Oliff & Berridge, PLC

(57) ABSTRACT

In one aspect the invention provides a friction welded component and a method of manufacture for such a component, comprising friction welding a reinforcement element (10) at an end cross-section thereof to a surface of a thin walled member (12) with an interlayer member (14) interposed between the reinforcement element and the surface of the thin walled member. The thin walled member and/or the interlayer are preferably of the same or similar material and the thickness of the thin walled member is preferably less than or equal to 6 mm and more preferably in the range 0.5 to 2 mm with the diameter of the reinforcement element being greater than 10 times the thickness of the thin walled member. The invention finds particular application in the fabrication of bosses to gas turbine aero-engine casings and fabricated nozzle components, for example.

11 Claims, 1 Drawing Sheet

FOREIGN PATENT DOCUMENTS

| | | |
|---|---|---|
| GB | 1 222 829 | 2/1971 |
| GB | 1 259 222 | 1/1972 |
| GB | 2 369 793 A | 6/2002 |
| JP | A 53-073454 | 6/1978 |
| JP | A 2001-287050 | 10/2001 |

OTHER PUBLICATIONS

Merriam Webster's Collegiate Dictionary, 10$^{th}$ edition, pp. 891 and 1079.*

* cited by examiner

FRICTION WELDING

This invention relates to friction welding and in particular concerns friction welding thin-walled structures.

The invention finds particular application in the manufacture of gas turbine aero-engine components such as engine casings and nozzles. Gas turbine aero-engine casings have hitherto been manufactured from titanium, nickel or steel forgings. Nozzle components such as duct sections and the like are usually fabricated from sheet material using highly accurate fusion welding methods such as electron beam welding.

The manufacture of thin walled components, such as gas turbine aero-engine casings or nozzle ducts, from metal forgings is particularly expensive in terms of material wastage and machining time. Typically ninety five percent of forging material is removed during the machining of an engine casing forging. This low material utilisation is a consequence of the forging process since the size of load bearing reinforced features such as bosses and the like on the casing surface determine the wall thickness of the forging that is necessary for correct material flow during the forging process. For example, a forging for an engine casing having a 25 mm (1 inch) diameter boss on its surface requires a minimum wall thickness of at least 25 mm to ensure correct material flow in the region of the boss during forging. Bosses are a common feature on gas turbine aero-engine components such as casings since they are used extensively for mounting pipes, vane spigots, and actuators, for example. Bosses are also used extensively for mounting pipes, actuators and nozzle flaps etc, on nozzle duct sections. Boss diameters of 25 mm or more are not uncommon on casings having a wall thickness in the region of 2–5 mm. The resultant material wastage and machining time adds both considerably to the manufacturing cost of thin-walled casing structures and the lead time of the machined component.

One attempt to address this problem has been to manufacture gas turbine aero-engine casings from sheet material using highly accurate fusion welding techniques such as electron beam welding. However, fusion welded bosses have a number of drawbacks particularly in terms of joint strength, mechanical integrity and the cost associated with non-destructive (NDI) weld inspection. In this respect fusion welded bosses are usually unsuitable for gas turbine aero-engine casing applications and the manufacture of casings from forgings has hitherto been preferred. The disadvantages associated with fusion welding bosses to thin walled casings are also relevant to fusion welding nozzle duct sections.

Friction welding has also been proposed for joining bosses to engine casings manufactured from thin sheet material. Friction welding is the welding method of choice in many welding applications since parent material strength can be achieved at the weld joint with little or no heat affected zone. Attempts at friction welding bosses to thin walled structures such as engine casings and nozzle ducts have not been entirety satisfactory however, since the tin walled casing cannot readily support the high forging loads generated during welding when the casing material becomes plastic. This results in the boss element punching through the thin walled casing, in a process known as "burn through", before a satisfactory weld is achieved. Hitherto it has only been possible to friction weld a solid circular section bar having a diameter of 25 mm to a sheet of the same or similar material when the thickness of the sheet is 4 mm or greater, without "burn through" occurring.

According to a first aspect of the invention there is provided a method of friction welding thin walled structures; the said method comprising friction welding a reinforcement element at an end cross-section thereof to a surface of a thin walled member with an interlayer member interposed between the said reinforcement element and the said surface.

The above aspect of the invention readily permits friction welding to be used for fabricating thin walled structures without "burn through", for example in the fabrication of bosses to thin walled structures to provide areas of local reinforcement. The present inventors have found that the forging force necessary for friction welding a reinforcement element such as a boss to the surface of a thin walled member can be more readily supported by the thin walled member when an interlayer is provided between the weld components. The interlayer increases the local thickness of the thin walled member at the weld site and thereby enables a greater forging force to be supported by the thin walled member during friction welding. In this way machining of the fabricated structure can be minimised.

Preferably, the reinforcement element, the thin walled member and/or the interlayer are of the same or similar material. This improves the strength of the welded joint. In the context of the present invention it is to be understood that the term "similar material" means materials that are compatible for friction welding, that is to say materials which do not form brittle intermatallic alloys at the weld interface.

In preferred embodiments, the material(s) of the said reinforcement element, interlayer and thin walled member is/are selected from the group comprising: titanium alloys, aluminium alloys, nickel alloys, cobalt alloys and steel.

Preferably, the thickness of the thin walled member is substantially the same as the thickness of the interlayer. The inventors have found that satisfactory welds can be more readily achieved when the thickness of the interlayer is the same as or similar to the thickness of the thin walled member.

In preferred embodiments, the thickness of the thin walled member is less than or equal to 6 mm. Preferably, the thickness of the said thin walled member is substantially in the range 0.5 to 2 mm. The method thus contemplates the joining of reinforced components such as bosses to relatively thin sheet material.

In preferred embodiments, the reinforcement element is generally cylindrical and it is preferable that the cylindrical reinforcement element has a generally circular cross-section. This readily enables circular cross-section cylindrical bosses to be friction welded using rotary inertia friction welding methods.

Preferably, the method further comprises the step of fixing the said interlayer member with respect to the said thin walled member prior to the friction welding step. In this way it is possible to weld the reinforcing element to the interlayer and thin walled member by known friction welding methods such that the interlayer becomes assimilated in the weld formed between the weld components.

The reinforcement element may be friction welded to a curved surface of the thin walled member. This readily enables this aspect of the invention to be applied to curved thin walled structures such as circular cylindrical aero-engine casings.

The reinforcement element may be friction welded to a convex surface of the thin walled member. This readily enables the reinforcement element to be joined to the outer surface of a structure such as circular cylindrical aero-engine casings.

According to a second aspect of the invention there is a method of friction welding thin walled structures; the said method comprising friction welding a generally cylindrical reinforcement element at an end cross-section thereof to a surface of a thin walled member, the said thin walled member having a thickness substantially in the range 0.25 mm to 6 mm and the said reinforcement element having a diameter greater than 10 times the said thickness.

The present inventors have found that it is possible to successfully friction weld a solid circular section cylindrical member having a diameter of 24 mm to a sheet of the same or similar material where the wall thickness of the sheet material is 1 mm or less. Another aspect of the invention provides a friction welded component welded in accordance with the above mentioned first aspect of the invention.

A further aspect of the invention provides a friction welded component welded in accordance with the above mentioned second aspect of the invention.

BRIEF DESCRIPTION OF THE DRAWINGS

The invention will now be more particularly described by way of example, with reference to the accompanying drawings, in which:

Referring to FIG. 1, a weld preparation for friction welding a circular cross-section cylindrical boss 10 to the surface of a thin walled member 12 is shown. The weld preparation further comprises an interlayer 14 interposed between the thin walled member 12 and the boss 10.

Figure 1:
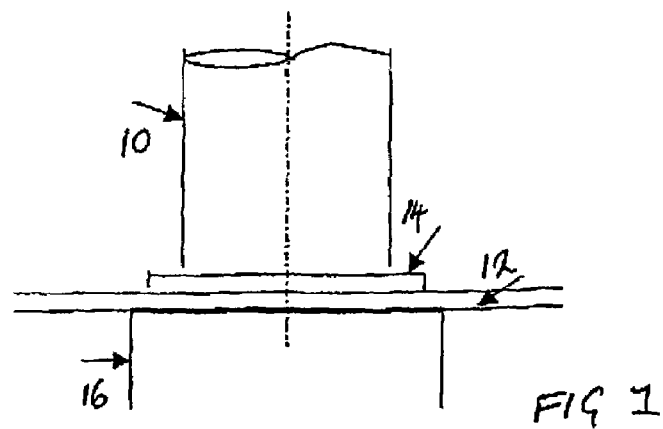
FIG. 1 is a cross-section view of a reinforcement boss, interlayer and a section of a thin walled member to be friction welded together; and, FIG. 2 shows the weld components of FIG. 1 in a perspective view.
Figure 2:
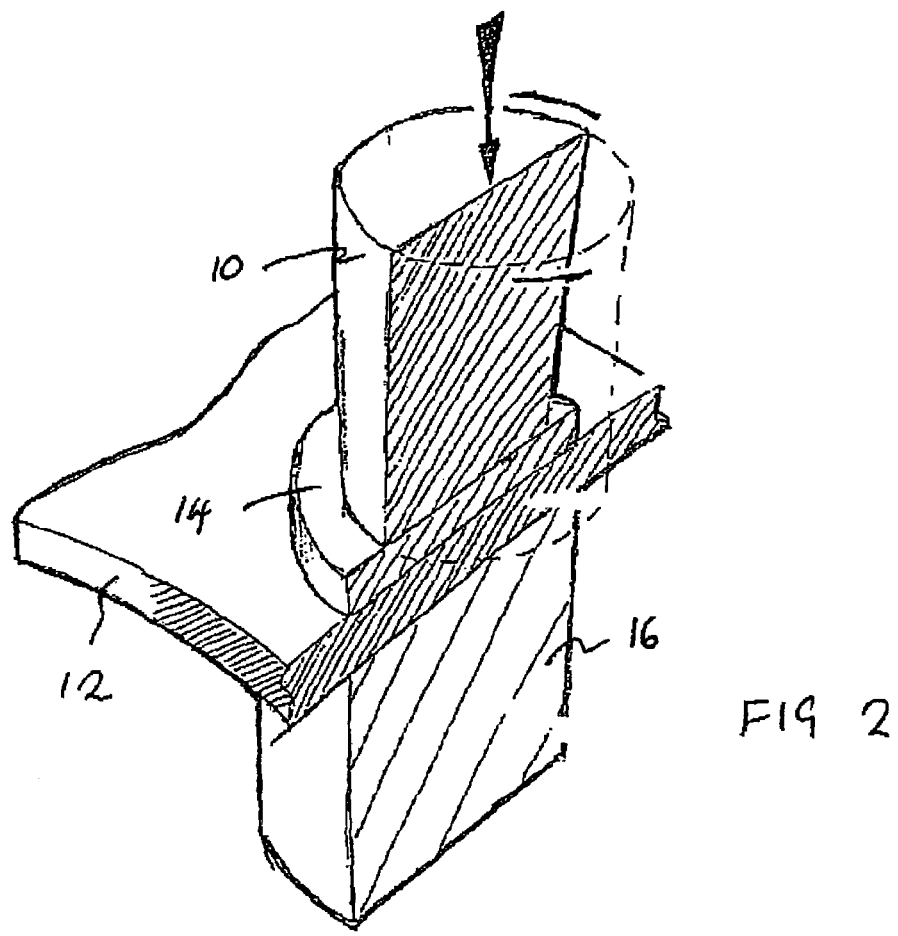

The thin walled member 12 may comprise a section of a gas turbine engine casing or a gas turbine engine nozzle or other thin walled structure, where the boss 10 is friction welded to the thin walled member 12 to provide a strengthening feature, for example in the form of a pipe connector or for supporting a compressor vane or nozzle flap mounting spigot in a throughbore (not shown) extending through the boss and the thin walled member.

The boss 10, thin wall casing 12 and interlayer 14 may be formed of any metal or metal alloy material suitable for friction welding. The material of the boss and interlayer may be the same as the material of the thin walled member, however different but compatible materials may be used, for example the boss may be steel and the thin walled member nickel alloy with the interlayer material being the same material as either the boss or the thin walled member. In another example the boss, interlayer and thin walled member may be titanium or a titanium alloy. Dissimilar materials such as titanium and steel and titanium and nickel result in brittle inter-metallic alloys and are incompatible for friction welding purposes. However, the present invention contemplates friction welding materials from the group comprising titanium and titanium alloys, aluminium and aluminium alloys, nickel and nickel alloys, cobalt and cobalt alloys and steels. In other embodiments the invention also contemplates friction welding plastics materials such as thermoplastics.

Any friction welding method may be used to join the boss and interlayer to the thin walled member although rotary inertia welding is preferred because of the circular symmetry of the cylindrical boss. Other friction welding methods may be used, for instance including linear or continuous drive friction welding.

Prior to friction welding the thin walled member is held in a friction welding fixture (not shown) as is well known in the art, and the interlayer 14 is fixed with respect to the thin walled member by clamping, welding or other means. If the intermediate layer 14 is welded it is preferred to spot weld the layer at positions remote from the weld interface. The boss 10 which is in the form of a cylindrical metal stud is friction welded at its end cross-section to the thin walled member through the intermediate layer 14 to form an upstanding cylindrical boss type member on the surface of the thin walled casing.

Because of the high forces employed in friction welding it is necessary to support the thin walled member by positioning a relatively large support in the form of a backing plate 16 on the opposite side of the thin walled member to the boss and the interlayer. The backing plate also functions as a heat sink during fixture welding and, although not shown in the drawing of FIG. 1, the backing plate may be cooled to remove heat from the weld zone.

In the process of friction welding the end of the boss or stud 10 to the thin wall casing frictional contact occurs between the contacting surfaces of the boss and interlayer. As the weld interface heats up the adjoining surfaces of the boss, interlayer and thin walled member become plastic and material upset occurs such that the boss becomes welded to the thin walled casing with the material of the interlayer being assimilated in the weld between the boss and the thin walled member. It is to be understood that in the context of friction welding the term "upset" means the reduction in the dimension of the components being friction welded in the direction of the forging force applied to the components when they are forced together.

When the weld components are forced together the forge force exerted by the boss on the thin walled member is reacted by the backing plate which acts against the thin walled member immediately below the weld zone. The backing plate acts as a heat sink and maintains an even temperature at the interior surface of the thin walled member. By ensuring the temperature of the weld does not exceed a predetermined maximum for the components being welded the boss does not fully penetrate the thin walled member and the heat affected zone of the weld is contained within the region of the weld.

Once welding has taken place, upset material or weld flash (not shown) may be removed from the external region of the weld at the interface between the boss and thin walled member. The cylindrical boss may be machined after it has been welded either to provide a localised area of thickening of the thin walled member, of say between 1 or 2 mm, or may be machined to form a boss for mounting a pipe or other component such as a vane spigot or nozzle flap spigot, for example.

In the method of the present invention it is preferred that the thin walled member and the interlayer have the same thickness and are of the same material although embodiments are envisaged where the dimensions and materials are different.

In one example of the present invention a circular cylindrical stud having a diameter of 23.8 mm was friction welded to a thin walled plate having a thickness of 1 mm using an interlayer of the same material as the plate with the interlayer, namely 6/4 Titanium alloy, also having a thickness of 1 mm. The weld thrust or forging force was 15 KN. The weld was formed using rotary inatia welding at speed of 4,500 rpm and an inertia of 3.81 lb ft$^2$. Although the invention is not limited by the above weld parameters, preferred embodiments are contemplated where the thin walled member has a thickness in the range 0.25–6 mm, the interlayer has a thickness of 0.25–6 mm, the circular cross-section cylindrical boss has a diameter of 3–100 mm, the forging force is in the range 1–4,000 KN, the speed of the rotary inertia weld is between 10 and 10,000 rpm and the inertia of the rotary inertia welding device is between 1 and 250,000 lb ft$^2$ depending on the components to be welded. The invention also contemplates friction welding tubular type bosses to thin walled members using an interlayer and tube diameters of 3–200 mm and tube wall sections of 0.25–30 mm are preferred.

In the above description the thin walled member constitutes part of a gas turbine aero engine casing or nozzle structure. In this respect it is to be understood that the boss may be friction welded to the surface of curved thin walled members such as large diameter cylindrical engine casing section. However, the present invention may be employed in the manufacture of other kinds of structures particular where local areas of reinforcement or thickening are required in or on thin walled structures.

Although aspects of the invention have been described with reference to the embodiments shown in the accompanying drawings it is to be understood that the invention is not limited to those precise embodiments and various changes and modifications may be affected without exercise of further inventive skill for example, the boss member can have a cross-section other than circular. In addition, although it is convenient to use circular section bosses for rotary friction welding, the invention also contemplates other methods of friction welding, for example friction stir welding in which case the bosses having shapes other than circular cross-sections may be used.

The invention claimed is:

1. A method of friction welding sheet metal structures, the method comprising friction welding a reinforcement element at an end cross-section thereof to a surface of a sheet metal member with an interlayer member interposed between the reinforcement element and the surface such that the reinforcement element is welded to the sheet metal with material of the interlayer being assimilated in the weld between the reinforcement element and the sheet metal.

2. A method as claimed in claim 1, wherein the reinforcement element, the sheet metal member and/or the interlayer are of the same or similar material.

3. A method as claimed in claim 1, wherein the material of the reinforcement element, interlayer and sheet metal member is/are selected from the group comprising: titanium alloys, aluminium alloys, nickel alloys, cobalt alloys and steel.

4. A method as claimed in claim 1, wherein a thickness of the sheet metal member is substantially the same as the thickness of the interlayer.

5. A method as claimed in claim 1, wherein a thickness of the sheet metal member is less than or equal to 6 mm.

6. A method as claimed in claim 5, wherein the thickness of the sheet metal member is substantially in a range of 0.5 to 2 mm.

7. A method as claimed in claim 1, wherein the reinforcement element is generally cylindrical.

8. A method as claimed in claim 7, wherein the cylindrical reinforcement element has a generally circular cross-section.

9. A method as claimed in claim 7, wherein the cylindrical reinforcement element has a diameter greater than about 10 times a thickness of the sheet metal member.

10. A method as claimed in claim 1, further comprising fixing the interlayer member with respect to the sheet metal member prior to the friction welding step.

11. A sheet metal component friction welded according to the method of claim 1.

* * * * *